UNITED STATES PATENT OFFICE.

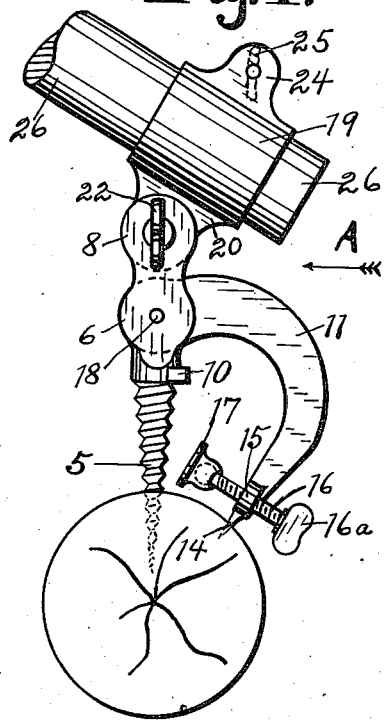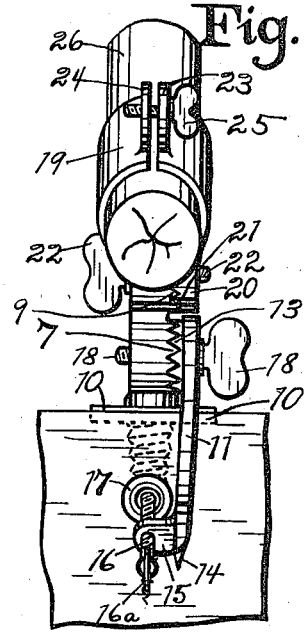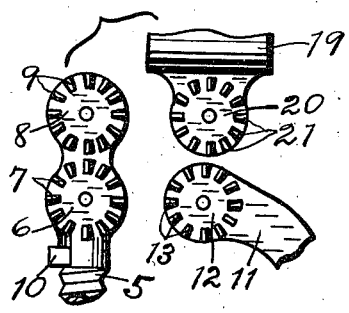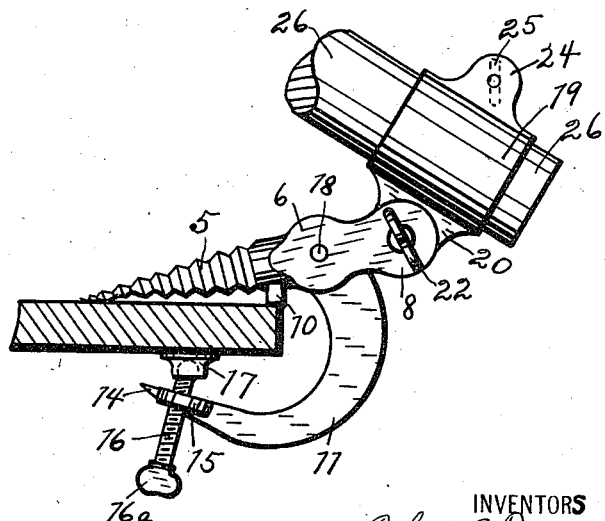

ROBERT C. PISCATOR AND CHARLES PISCATOR, OF INDIANAPOLIS, INDIANA.

FISHING-ROD HOLDER.

977,835.  Specification of Letters Patent.  Patented Dec. 6, 1910.

Application filed March 3, 1910. Serial No. 547,097.

*To all whom it may concern:*

Be it known that we, ROBERT C. PISCATOR and CHARLES PISCATOR, citizens of the United States, and residents of the city of Indianapolis, in the county of Marion and State of Indiana, have invented certain new and useful Improvements in Fishing-Rod Holders, of which the following is a specification.

Our invention relates to fishing-rod holders and the object of our improvement is to provide a device which can be quickly and easily attached to and removed from the gunwale or seat of a boat, a log, a tree or other convenient object and to maintain the fishing-rod at any desired angle. We attain these objects by means of the device illustrated in the accompanying drawings, in which—

Figure 1 is a side elevation showing the device secured to a log; Fig. 2 is an elevation looking in the direction of the arrow A in Fig. 1, and showing the device secured to the side of a boat or other like object; Fig. 3 is a view showing the radiating toothed disks; and, Fig. 4 is an elevation showing the device secured to a boat seat or other object of like thickness.

Similar numerals of reference indicate like parts throughout the several views.

The screw 5 is provided with the perforated disk 6 having the radiating teeth 7, and the perforated disk 8 having the radiating teeth 9. The cross bar 10 is secured to said screw 5 to engage any object which the device may be clamped to, to prevent its being twisted. The clamp member 11 is provided at one end with a disk 12 having the radiating teeth 13 to correspond and mesh with said radiating teeth 7, and on the other end a point 14 and a boss 15. Said point 14 is provided to engage a log (Fig. 1) or the like to prevent the device from being turned. Said boss 15 is threaded to receive the screw 16, which screw is provided with thumb-head 16ª on one end, and the foot piece 17 is secured to the other end by means of a ball and socket joint. The perforated disk 12 of said clamp member is removably secured to said disk 6 of the screw 5 by means of the thumb-screw 18.

The slitted cylindrical clamp 19 is provided with the integral ear 20 having the radiating teeth 21 which correspond and mesh with the radiating teeth 9. Said ear 20 is removably secured to said disk 8 by means of the thumb-screw 22. Said cylindrical clamp is also provided with the ears 23 and 24 and adjusted by means of the thumb-screw 25 to secure a fishing-pole 26 therein. Said cylindrical clamp may be made in two parts, hinged together at a point near the ear 20, to accommodate small poles without departing from our invention.

The operation of our invention is as follows:—To secure it to a tree, log or other large object, (Fig. 1) loosen the thumb-screw 18 and raise the clamp member out of the way and insert the screw into the desired object by using the slitted cylindrical clamp as a handle, when a sufficient depth is reached, lower the clamp member until the point 14 engages the object and tighten said set screw 18. The point 14 being in engagement with the object prevents the device from being turned by the flowing water pulling on the line or from any cause. Insert the butt of a fishing-rod in the slitted cylindrical clamp and tighten the thumb-screw 25 to secure the rod in said clamp. Loosen the thumb-screw 22 and raise the fishing-rod to the desired angle and tighten said thumb-screw 22.

When it is desired to remove the device, loosen the thumb-screw 25 and remove the fishing-rod from the slitted cylindrical clamp; loosen the thumb-screw 18 and raise the clamp member to free the points 14 and unscrew the screw 5 from the object.

To secure the device to the side or seat of a boat or an object of similar thickness, (Figs. 2 and 4) loosen the thumb-screw 18 as before, and place the screw 5 at one side of said object with the cross bar 10 in contact with the object to form a brace to prevent the device from twisting or becoming loose, and bring the point 14 of the clamp member 11 to contact with said object and tap lightly to insure a good engagement, then tighten said thumb-screw 18.

The fishing-rod is secured in the slitted cylindrical clamp as before stated. To remove the device, remove fishing-rod as before, and loosen thumb-screw 18 and the device is free.

A stake may be driven in the earth and the screw 5 inserted in its upper end, when there is no other object handy.

The device is quickly and easily attached and removed and can be carried in the pocket if desired.

What we claim as new and desire to secure by Letters-Patent, is—

A rod holder comprising a screw member provided with two perforated radiating toothed disks, a curved clamping arm having a perforated radiating toothed disk on one of its ends adjustably secured to one of the perforated radiating toothed disks of said screw member and gradually tapered through its length to a point at its other end, a threaded ear formed on the side of said curved clamping member at a point near its pointed end, a thumb screw fitted in said threaded ear, a swiveled clamping head secured to said thumb screw by means of a ball-joint, a cross bar secured to said screw member at the top of its threaded portion, and a slitted cylindrical rod clamp provided with a perforated supporting ear having teeth radiating from said perforation adjustably secured to the other of the perforated radiating toothed disks of said screw member.

In witness whereof we hereunto set our hands in the presence of two witnesses.

ROBERT C. PISCATOR.
CHARLES PISCATOR.

Witnesses:
 FRANCIS M. SPRINGER,
 EARL COLSON.